United States Patent
Magnus et al.

(10) Patent No.: US 6,800,126 B2
(45) Date of Patent: Oct. 5, 2004

(54) PREPARATION AND USE OF COMPOSITE OF RUBBER AND CARBON BLACK AGGREGATES AND ARTICLES OF MANUFACTURE, INCLUDING TIRES, HAVING A COMPONENT COMPRISED THEREOF

(75) Inventors: Fredrick Lewis Magnus, Mogadore, OH (US); Ramesh Gujarathi, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 108 days.

(21) Appl. No.: 10/345,536

(22) Filed: Jan. 16, 2003

(65) Prior Publication Data

US 2003/0158325 A1 Aug. 21, 2003

Related U.S. Application Data

(60) Provisional application No. 60/356,246, filed on Feb. 12, 2002.

(51) Int. Cl.$^7$ .............. C08L 9/00; C08K 3/04; C08K 13/06; C08J 3/20; C08J 3/205
(52) U.S. Cl. .......... 106/477; 152/151; 524/300; 524/432; 524/571; 524/575; 524/575.5
(58) Field of Search .............. 106/477; 152/151; 524/300, 432, 571, 575, 575.5

(56) References Cited

U.S. PATENT DOCUMENTS

| | | | |
|---|---|---|---|
| 3,294,733 A | 12/1966 | Medalia et al. | 260/41.5 |
| 3,298,984 A | 1/1967 | Rye | 260/29.3 |
| 3,304,281 A | 2/1967 | Tucker | 260/33.6 |
| 3,317,458 A | 5/1967 | Bonn et al. | 260/41.5 |
| 3,345,324 A | 10/1967 | Bristol et al. | 260/41.5 |
| 3,350,342 A | 10/1967 | Begley | 260/33.6 |
| 3,491,052 A | 1/1970 | Hare et al. | 260/29.7 |
| 3,533,988 A | 10/1970 | Morris et al. | 260/41.5 |
| 3,767,605 A | 10/1973 | Gerlicher | 260/23.7 |
| 3,923,707 A | 12/1975 | Berg et al. | 260/17 |
| 4,132,698 A * | 1/1979 | Gessler et al. | 524/518 |
| 6,579,930 B2 * | 6/2003 | Herberger et al. | 524/492 |

* cited by examiner

Primary Examiner—Kelechi C. Egwim
(74) Attorney, Agent, or Firm—Henry C. Young, Jr.

(57) ABSTRACT

This invention relates to preparation and use of a rubber/carbon black composite comprised of at least one elastomer which contains a dispersion therein of carbon black aggregates. Such carbon black is formed by preparing a pre-blend comprised of uncompacted carbon black aggregates and oil and/or aqueous latex of, preferably, a low molecular weight diene-based elastomer particles, followed by blending said pre-blend with an aqueous emulsion of diene-based elastomer particles and/or with an organic solution of a diene-based elastomer, and/or with solid diene-based elastomers, and recovery therefrom of a solid rubber/carbon black composite comprised of said diene-based elastomer, (which may include butyl rubber, EPDM rubber and thermoplastic polymers), which contains a dispersion therein of said carbon black aggregates having an apparent density significantly lower than the specific gravity of said carbon black aggregates and significantly lower than compacted carbon black aggregates. Such carbon black aggregates may be optionally in a form of silica treated carbon black which contains silica domains on its surface. A rubber composition is further provided which is comprised of said rubber/carbon black composite. An article of manufacture is also provided, such as a tire, having at least component comprised of said rubber/carbon black composite or said rubber composition.

21 Claims, No Drawings

PREPARATION AND USE OF COMPOSITE OF RUBBER AND CARBON BLACK AGGREGATES AND ARTICLES OF MANUFACTURE, INCLUDING TIRES, HAVING A COMPONENT COMPRISED THEREOF

The Applicants hereby incorporate by reference prior U.S. Provisional Application Ser. No. 60/356,246, filed on Feb. 12, 2002.

FIELD OF THE INVENTION

This invention relates to preparation and use of a rubber/carbon black composite comprised of at least one elastomer which contains a dispersion therein of carbon black aggregates. Such carbon black is formed by preparing a pre-blend comprised of uncompacted carbon black aggregates and oil and/or aqueous latex of, preferably, a low molecular weight diene-based elastomer particles, followed by blending said pre-blend with an aqueous emulsion of diene-based elastomer particles and/or with an organic solution of a diene-based elastomer, and/or with solid diene-based elastomers, and recovery therefrom of a solid rubber/carbon black composite comprised of said diene-based elastomer, (which may include butyl rubber, EPDM rubber and thermoplastic polymers), which contains a dispersion therein of said carbon black aggregates having an apparent density significantly lower than the specific gravity of said carbon black aggregates and significantly lower than compacted carbon black aggregates. Such carbon black aggregates may be optionally in a form of silica treated carbon black which contains silica domains on its surface. A rubber composition is further provided which is comprised of said rubber/carbon black composite. An article of manufacture is also provided, such as a tire, having at least component comprised of said rubber/carbon black composite or said rubber composition.

This invention relates to preparation of a rubber/carbon black composite comprised of at least one elastomer which contains a dispersion therein of carbon black aggregates. Such carbon black is formed by preparing a oil/carbon black aggregate premix composite and blending said premix composite with either with an aqueous emulsion of diene-based elastomer particles or with an organic solution of a diene-based elastomer and recovery thereof to form a solid rubber/carbon black composite comprised of said diene-based elastomer which contains a dispersion therein of said carbon black aggregates having a low apparent density. Such carbon black aggregates may be optionally in a form of silica treated carbon black which contains silica domains on its surface. A rubber composition is further provided which is comprised of said rubber/carbon black composite. An article of manufacture is also provided, such as a tire, having at least component comprised of said rubber/carbon black composite or said rubber composition.

BACKGROUND OF THE INVENTION

Carbon black for reinforcement of various rubber compositions is conventionally used in a form of compacted carbon aggregates, usually in a form of pellets of compacted carbon black aggregates.

The carbon black aggregates themselves are composed of aggregated primary carbon black particles of colloidal dimensions and high surface area by deposited from a carbon black vapor phase at very high temperatures. Such carbon black aggregates have very low apparent densities as compared to their specific gravity.

However in general commercial practice, the fine particles of carbon black aggregates are dusty in nature and are more easily processible by being compacted, for example compacted into pellets, for mixing with rubber compositions in order to reduce the presence of the dusty carbon black particulate aggregates in a rubber product manufacturing environment. Such pellets of compacted carbon black have an apparent density more nearly approximating the specific gravity of the carbon black.

Upon mixing with rubber compositions under high shear mixing conditions, the compacted carbon black pellets break down to granules of compacted carbon black aggregates of which only a minority, if any, are present in an uncompacted carbon black aggregate form.

However, it is considered herein that use of carbon black aggregates in their relatively low apparent density form, rather than granulated compacted carbon black aggregates with a substantial higher apparent density, is more desirable to promote or enhance reinforcement of elastomers.

Historically various carbon black/elastomer pre-blends, or masterbatches, have also been prepared and used for blending with additional elastomers. Such masterbatches have been prepared, for example, by:

(A) first masterbatching various rubber latices with carbon black, usually in a compacted (e.g. pelletized) form, under low shear and temperatures followed by (B) blending the masterbatch with additional elastomer(s) and compounding ingredients under high shear and temperature conditions.

For example, see U.S. Pat. Nos. 3,294,733; 3,298,984; 3,317,458; 3,345,324; 3,491,052; 3,767,605 and 3,923,707.

U.S. Pat. No. 3,317,458, for example, relates to masterbatching a combination of carbon black and silica with a rubber latex.

Various rubber compositions have also heretofore been prepared by mixing an aqueous slurry of carbon black with an organic solvent solution of elastomer(s). For example see U.S. Pat. No. 3,350,342.

U.S. Pat. No. 3,304,281, for example, relates to mixing together a solution of one polymer with a latex of another polymer and then coagulating the rubber crumb from the resulting mixture. Such process is said to be useful in incorporating an oil and/or carbon black into the polymer. For example according to the patent disclosure, the oil can be introduced as an aqueous emulsion and the oil emulsion mixed with the latex prior to contact with the solution. Alternatively, all three components can be mixed simultaneously. Alternatively, an aqueous slurry of such carbon black can be added to the solution-latex mixture or it can be mixed with the latex prior to mixing with the solution.

U.S. Pat. No. 3,491,052 for example, relates to mixing an elastomer in an aqueous latex form with a solution of an elastomer which has been dissolved in a water immiscible organic solvent to form a pseudo-emulsion and recovering the mixed elastomers by adding a latex coagulating agent at a temperature sufficient to vaporize the solvent. Alternatively a rubber pigment (e.g. carbon black) may be dispersed in the pseudo-emulsion prior to coagulation.

U.S. Pat. No. 3,533,988, for example, relates to blending a hydrocarbon solution of rubber with an aqueous suspension of a rubber reinforcing agent, such as carbon black. In its background discussion, it relates that, theretofore, in order to avoid a disagreeableness of handling dry, dusty carbon black with raw rubber on mixing rolls, a method was developed for producing masterbatch by dispersing carbon black directly into a rubber solution produced by monomer polymerization in the presence of a solvent. It further relates that, theretofore, another method was to disperse carbon black in a hydrocarbon and mix the dispersion with the rubber solution.

In the description of this invention, the term "phr" relates to parts by weight of an ingredient per 100 parts by weight of rubber.

The terms "rubber" and "elastomer" are used interchangeably unless otherwise specified.

The term "Tg" relates to a glass transition temperature of an elastomer, normally determined by a differential scanning (DSC) calorimeter with a temperature rise of 10° C. per minute.

DISCLOSURE AND PRACTICE OF THE INVENTION

In accordance with this invention, a process of preparing a rubber composition is provided which comprises:

(A) blending non-compacted carbon black aggregates with rubber processing oil to form a pre-formed oil/carbon black aggregate composite comprised of said oil and said carbon black aggregates, wherein said rubber processing oil is selected from rubber processing oils comprised of aromatic, paraffinic and/or naphthenic containing rubber processing oils, wherein said rubber processing oil is in a form of:
(1) neat oil, or
(2) emulsified oil comprised of:
  (a) water, surfactant and particles of emulsified oil, or
  (b) aqueous latex of particles of diene-based elastomer(s) and particles of emulsified oil, followed by:

(B) blending said pre-formed oil/carbon black aggregate composite with
(1) an aqueous emulsion of diene-based elastomer particles, and/or
(2) an organic solvent solution of at least one diene-based elastomer, and/or
(3) at least one solid diene-based elastomer, followed by (C) recovering therefrom a pre-formed elastomer composite comprised of said pre-formed carbon black/oil composite and said blended diene-based elastomer by removing said water and/or solvent therefrom, as the case may be, and wherein said recovered elastomer composite is comprised of said blended diene-based elastomer having a dispersion therein of said non-compacted carbon black aggregates.

In practice, the weight ratio of said oil to said non-compacted carbon black aggregates may desirably be in a range of about 10/90 to about 50/50 although other weight ratios may be used if desired.

In practice, the weight ratio of said pre-formed carbon black/oil composite to said emulsion and/or solvent solution of diene-based elastomer to form said pre-formed elastomer composite (a masterbatch) may desirably be in a range of about 30/70 to about 70/30 of said pre-formed carbon black/oil composite to said elastomer contained in said emulsion and/or solvent solution thereof, although other weight ratios may used if desired.

A significant aspect of using the non-compacted carbon black aggregates with very low apparent densities for this invention, instead of using compacted carbon black aggregates with a substantially higher apparent density, is to utilize the high absorption capacities of such carbon black aggregates, particularly where it is desired for the carbon black to have a greater ability to absorb various ingredients onto its surface and to thereby ultimately provide a resulting free flowing rubber composition.

Another significant aspect is considered herein to be better molecular interaction between the polymer (elastomer) and particulate, low apparent density, carbon black aggregates themselves which is considered herein to enhance one or more various physical properties of resulting rubber compositions. Another significant aspect is considered herein to be an enhanced ability of the non-compacted carbon black to absorb and/or react with transition elastomer which contains hard segments and soft segments, such as for example, a tapered elastomer, or functionalized tapered elastomer, such as for example styrene/butadiene rubber that contains hard segments (e.g. polystyrene segments) that associate/react with the solid carbon black aggregates, and soft segments in the copolymer (e.g. polybutadiene segments), with a gradient of increasing polybutadiene content in the copolymer along the copolymer chain that interact with the additional elastomers in the pre-formed elastomer composition.

In additional accordance with this invention, said pre-formed oil/carbon black aggregate composite for use in this invention is blended with said organic solvent solution of elastomer particles under low shear conditions at a temperature, for example, within a range of about 20° C. to about 100° C., alternatively about 40° C. to about 80° C. which is in contrast to a conventional practice of blending compacted (e.g. pelletized) carbon black aggregates with a solid rubber composition under high shear conditions at a temperature in a range of about 120° C. to about 170° C. that is conventionally practiced in the rubber product manufacturing industry. This is considered herein to be significant because it is considered herein that better carbon black/elastomer interaction is obtained by the practice of this invention due to use of a smaller carbon black particles (e.g. carbon blacks of higher surface area) are used in a form of non-compacted aggregates of carbon black with an attendant reduction in elastomer/carbon black mixing energy as a result of not requiring the mixing of carbon black with the elastomer under high shear conditions.

In another aspect of the invention, it is contemplated that particulate partitioning agents may be blended with the non-compacted carbon black in order to provide said pre-formed carbon black/oil composite in a form of a free flowing pre-formed carbon black/oil composite. Representative of particulate partitioning agents are, for example fatty acids such as, for example, oleic acid, palmitic, linoleic and/or stearic acid as well as particles of, for example zinc oxide and/or compacted carbon black.

In a further aspect of the invention, it is contemplated that the non-compacted carbon black aggregates may be blended with compacted carbon black aggregates,(e.g. pelletized carbon black) by blending of the carbon black particles in a liquid state and/or solid state mixing process(es).

In the practice of the invention, various diene-based (sulfur vulcanizable) elastomers may be used for the preparation of said pre-formed elastomer composite, exemplary of which are homopolymers and copolymers of conjugated diene hydrocarbons and copolymers of at least one conjugated diene hydrocarbon with an aromatic vinyl compound selected from styrene and alphamethyl styrene.

Preferred conjugated dienes for said pre-formed elastomer composite are isoprene and 1,3-butadiene. Preferred aromatic vinyl compound is styrene.

Representative of various conjugated diene-based elastomers for preparation of said pre-formed elastomer composite are, for example, cis 1,4-polyisoprene, 1,3-butadiene, styrene/butadiene copolymers, isoprene/butadiene copolymers, styrene/isoprene/butadiene copolymers and functionalized versions thereof.

Preferably, such conjugated diene-based elastomers for preparation of said pre-formed elastomer composite are organic solvent solutions thereof prepared by solvent solution polymerization of the monomers. In such case, such elastomers may be preferably used in their polymerizate form as hereinbefore discussed, namely in the organic solvent solution in which their respective monomers have been polymerized to form the elastomer, so that the elastomers do not have to be re-dissolved in a volatile organic solvent.

The rubber composition prepared by the process of this invention is considered herein as being useful, or advantageous, in the preparation of rubber composition as a component of an article of manufacture, because the expected improved dispersion of dispersed ingredients within the pre-formed elastomer composite, and improved uniformity of dispersion of the carbon black in its aggregate form within the pre-formed elastomer composite; improved energy balance because the typical very high energy needed to dry mixing the ingredients in an internal rubber mixer is replaced by a low energy organic solvent mixing process; more efficient use of respective compounding ingredients within the elastomer, including a reduction of quantity; improved efficiency of mixing ingredients within an elastomer ant therefore improved overall manufacturing efficiency.

In further accordance with this invention a rubber composition is prepared by blending said pre-formed elastomer composite with one or more additional diene-based elastomers as well as appropriate rubber compounding ingredients as may be desired.

In additional accordance with this invention an article of manufacture is provided having at least one component comprised of said rubber composition In further accordance with invention a tire is provided having at least one component comprised of said rubber composition.

In further accordance with this invention a tire is provided having a tread comprised of the rubber composition of this invention.

In practice, the rubber composition of this invention can be prepared by compounding by methods generally known in the rubber compounding art, such as for example mixing the pre-formed elastomer composite in an internal rubber mixer with, for example additional elastomers and various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and additional reinforcing materials such as, for example, carbon black and silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 10 phr, if used. Such processing aids can include, for example, aromatic, naphthenic, and/or paraffinic processing oils. Representative silicas may be, for example, hydrated amorphous silicas. Typical amounts of antioxidants comprise about 1 to about 3 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants for the sidewall composition may comprise about 3 to about 6 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The presence and relative amounts of the above additives are considered to be not an aspect of the present invention which is more primarily directed to use of aggregates of carbon black introduced to an elastomer via use of a pre-formed elastomer composite comprised of a pre-formed oil/carbon black aggregate composite and the further preparation and use of rubber compositions which contain such pre-formed elastomer composite.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators, including primary and optionally secondary accelerators, are used to control the time and/or temperature required for vulcanization and to improve the properties of the vulcanizate. Often accelerators are used in an amount ranging from about 0.5 to about 2 and even up to about 4, phr. Such accelerators may be, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Sometimes a combination of antioxidants, antiozonants and waxes may be collectively referred to as "anti-degradants".

A tire can be built, shaped, molded and cured by various methods, which will be readily apparent to those having skill in such art.

The prepared tire of this invention is conventionally shaped and cured by methods known to those having skill in such art.

The following Examples are presented in order to further represent significant aspects of the invention. The parts and percentages are by weight unless otherwise indicated.

EXAMPLE I

Preparation of Pre-Formed Carbon Black/Oil Aggregates

A pre-formed composite of oil and carbon black aggregates as free flowing particulates is prepared. The composite contained a minor amount of oil in an amount of about 40 weight percent oil and about 60 weight percent non-compacted (e.g. non-pelletized) carbon black aggregates. The composite was prepared by blending the non-compacted carbon black aggregates with rubber processing oil at a temperature of about 22° C. under low shear conditions with the ingredients illustrated in the following Table 1.

TABLE 1

| Materials | Parts |
|---|---|
| Rubber processing oil[1] | 40 |
| Carbon black aggregates[2] | 60 |

[1]Aromatic rubber processing oil
[2]Non-compacted (unpelletized) carbon black aggregates

EXAMPLE II

Preparation of Pre-Formed Elastomer Composite

A pre-formed elastomer composite of diene-based rubber and the pre-formed carbon black/oil composite of Example I is prepared by blending the preformed carbon black/oil composite of Example I with an organic solvent solution of polybutadiene elastomer under low shear and relatively low temperature (about 24° C.) conditions. The resulting blend was recovered by flash evaporation of the solvent (hexane) and drying to remove residual solvent.

The following Table 2 illustrates the pre-formed elastomer composite ingredients.

TABLE 2

| Materials | Parts |
|---|---|
| Pre-formed carbon black aggregate/oil composite[1] | 65 |
| Cis, 1,4-polybutadiene elastomer solution[2] | 218 |

[1]Pre-formed carbon black/oil composite of Example I
[2]Organic solvent (hexane) solution of cis 1,4-polybutadiene elastomer comprised of about 23 weight percent cis 1,4-polybutadiene elastomer and about 77 weight percent hexane obtained from The Goodyear Tire & Rubber Company.

EXAMPLE III

Preparation of Rubber Composition

A rubber composition was prepared which were comprised of a dry mixed control rubber composition (containing cis 1,4-polybutadiene rubber, compacted carbon black in a pelletized form, and rubber processing oil) was prepared and identified herein as a precursor to Control Sample A.

A rubber composition was prepared comprised of a liquid mixed commercial product obtained as Taktene 1359 ™ from the Bayer company (which contained a cis 1,4-polybutadiene rubber, compacted carbon black, and rubber processing oil) and identified herein as a precursor to Control Sample B.

A rubber composition based masterbatch, as a precursor to Sample C, was prepared by liquid mixing cis 1,4-polybutadiene cement comprised of the polybutadiene and hexane which contained 23 weight percent of the polybutadiene, additional hexane to reduce the polybutadiene content to 18 weight percent, and the carbon/oil composite of Table 1 of Example I.

Samples A, B and C were prepared by blending these associated precursors with additional elastomers additional elastomer(s) and rubber compounding ingredients under high shear conditions in an internal rubber mixer at elevated temperatures. In particular the non-productive mixing (in the absence of sulfur and accelerator curatives) conducted for about 5 minutes to about 160° C. upon which the rubber composition was dumped from the mixer and allowed cool to less than 40° C. following which sulfur and vulcanization accelerator(s) were blended therewith in an internal rubber mixer for about 2 minutes to a temperature of about 110° C. as illustrated in the following Table 3.

TABLE 3

| | Control | | |
|---|---|---|---|
| Material | Sample A | Sample B | Sample C |
| Non-Productive Mixing | | | |
| Cis 1,4-polybutadiene rubber[1] | 100 | 0 | 0 |
| Carbon black[2] | 77 | 0 | 0 |
| Aromatic oil | 53 | 0 | 0 |
| Productive Mixing | | | |
| Parts of above non-productive mix | 115 | 0 | 0 |
| Taktene 1359[3] | 0 | 115 | 0 |
| Parts of Table 2 (Example II) composition | 0 | 0 | 115 |
| SBR/carbon black/oil composite[4] | 81 | 81 | 81 |

A combination of sulfur and accelerators were mixed in the productive mixing stage in conventional amounts.
[1]Obtained as Budene ® 1207 from The Goodyear Tire and Rubber Company
[2]N234 carbon black, an ASTM designation
[3]From Bayer Corporation
[4]Obtained as Carbomix 3651 from DSM Copolymer

EXAMPLE IV

Various physical properties of Control Samples A and B and Sample C are represented in the following Table 4.

TABLE 4

| | Control | | |
|---|---|---|---|
| Property | Sample A | Sample B | Sample C |
| 100% modulus (psi) | 370 | 321 | 453 |
| 300% modulus (psi) | 1615 | 1479 | 1822 |
| G' at 1% strain, 1 Hz | 3220 | 3060 | 3825 |
| G' at 10% strain, 1 Hz | 1573 | 1465 | 1928 |
| G' at 50% strain, 1 Hz | 920 | 856 | 1137 |
| Tan delta at 10% strain, 1 Hz | 0.205 | 0.222 | 0.185 |

It can be seen from Table 4 that significant improvement in elastomer reinforcement (e.g. 100 percent and 300 percent moduli and G' values) are observed from Sample C, as compared to Control Sample A and B.

It can also be seen from Table 4 that a reduction in hysteresis (e.g. reduced Tan delta) occurred in the Sample C as compared to Control Samples A and B.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition which comprises:

(A) blending non-compacted carbon black aggregates with rubber processing oil to form a pre-formed oil/carbon black aggregate composite comprised of said oil and said carbon black aggregates, wherein said rubber processing oil is selected from rubber processing oils comprised of aromatic, paraffinic and/or naphthenic containing rubber processing oils, wherein said rubber processing oil is in a form of:
(1) neat oil, or
(2) emulsified oil comprised of:
(a) water, surfactant and particles of emulsified oil, or
(b) aqueous latex of particles of diene-based elastomer(s) and particles of emulsified oil, followed by:
(B) blending said pre-formed oil/carbon black aggregate composite with
(1) an aqueous emulsion of diene-based elastomer particles, and/or
(2) an organic solvent solution of at least one diene-based elastomer, and/or
(3) at least one diene-based elastomer, followed by
(C) recovering therefrom a pre-formed elastomer composite comprised of said pre-formed carbon black/oil composite and said blended diene-based elastomer by removing said water and/or solvent therefrom, as the case may be, and wherein said recovered elastomer composite is comprised of said blended diene-based elastomer having a dispersion therein of said non-compacted carbon black aggregates.

2. The process of claim 1 wherein the weight ratio of said oil to said non-compacted carbon black aggregates is in a range of about 10/90 to about 50/50.

3. The process of claim 1 wherein the weight ratio of said pre-formed carbon black/oil composite to said emulsion and/or solvent solution of diene-based elastomer to form said pre-formed elastomer composite (a masterbatch) is in a range of about 30/70 to about 70/30 of said pre-formed carbon black/oil composite to said elastomer contained in said emulsion and/or solvent solution thereof.

4. The process of claim 1 wherein said pre-formed carbon black/oil composite contains at least one particulating agent selected from fatty acids, and particles of zinc oxide and compacted carbon black and their mixtures.

5. The process of claim 4 where said fatty acids are comprised of oleic acid, palmitic, linoleic and stearic acid and their mixtures.

6. The process of claim 1 wherein said pre-formed carbon black/oil composite is blended with a tapered styrene/butadiene elastomer that contains hard polystyrene segments and soft polybutadiene segments with a gradient of increasing polybutadiene content along the elastomer chain.

7. The process of claim 4 wherein said pre-formed carbon black/oil composite is blended with a tapered styrene/butadiene elastomer that contains hard polystyrene segments and soft polybutadiene segments with a gradient of increasing polybutadiene content along the elastomer chain.

8. A pre-formed carbon black/oil composite prepared according to the process of claim 1.

9. A pre-formed carbon black/oil composite prepared according to claim 4.

10. A pre-formed carbon black/oil composite prepared according to claim 6.

11. A pre-formed elastomer composite prepared by blending said pre-formed carbon black/oil composite of claim 8 with a solvent solution of a diene based elastomer and/or emulsion of diene-based elastomer particles and recovering a pre-formed elastomer composite therefrom.

12. A pre-formed elastomer composite prepared by blending said pre-formed carbon black/oil composite of claim 9 with a solvent solution of a diene based elastomer and/or emulsion of diene-based elastomer particles and recovering a pre-formed elastomer composite therefrom.

13. A pre-formed elastomer composite prepared by blending said pre-formed carbon black/oil composite of claim 10 with a solvent solution of a diene based elastomer and/or emulsion of diene-based elastomer particles and recovering a pre-formed elastomer composite therefrom.

14. A rubber composition prepared by blending said pre-formed elastomer composite of claim 11 with one or more additional diene-based elastomers.

15. A rubber composition prepared by blending said pre-formed elastomer composite of claim 12 with one or more additional diene-based elastomers.

16. A rubber composition prepared by blending said pre-formed elastomer composite of claim 13 with one or more additional diene-based elastomers.

17. A article of manufacture having at least one component comprised of the rubber composition of claim 14.

18. A tire having at least one component comprised of the rubber composition of claim 14.

19. A tire having at least one component comprised of the rubber composition of claim 15.

20. A tire having at least one component comprised of the rubber composition of claim 16.

21. A tire having a tread comprised of the rubber composition of claim 14.

* * * * *